July 3, 1928. 1,675,750
F. P. DAHLSTROM ET AL
RAIL BOND
Filed Sept. 2, 1921
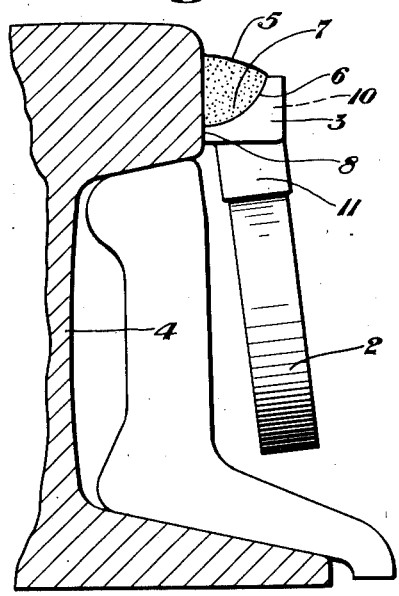
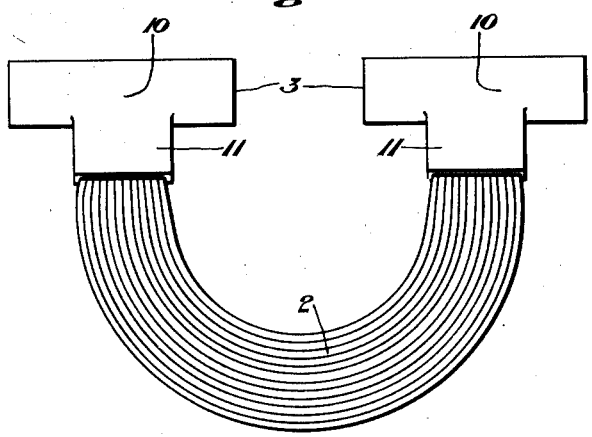
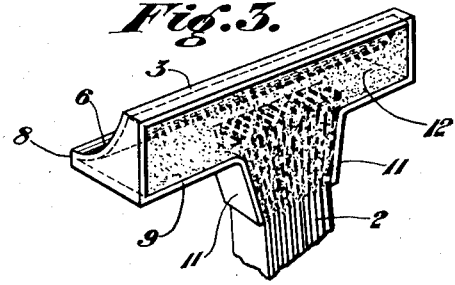
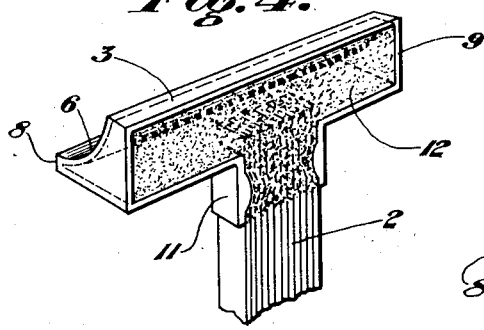
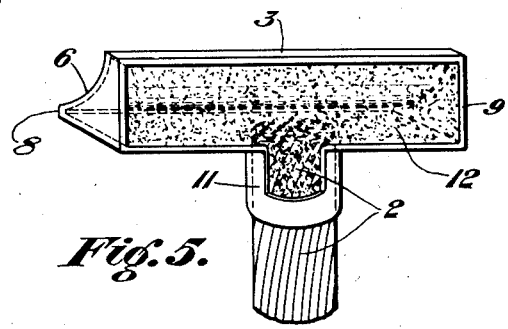
Witnesses:
Edwin Trueb
Inventors:
FRANK P. DAHLSTROM and
CHARLES L. LARSON,
by: D. Anthony Usina
their Attorney.

Patented July 3, 1928.

1,675,750

UNITED STATES PATENT OFFICE.

FRANK P. DAHLSTROM AND CHARLES L. LARSON, OF WORCESTER, MASSACHUSETTS, ASSIGNORS TO THE AMERICAN STEEL AND WIRE COMPANY OF NEW JERSEY, A CORPORATION OF NEW JERSEY.

RAIL BOND.

Application filed September 2, 1921. Serial No. 498,122.

This invention relates to rail bonds having rigid terminals fixed to the ends of a flexible rail bond conductor, and more particularly relates to the shape and composition of the terminals of rail bonds, wherein the bond terminals are permanently united to the rail bond conductor by a fusing or welding operation.

One object of our invention is the provision in a rail bond having a flexible conductor and rigid terminals, of terminals whch are composed of dissimilar metals, or metals of differing electrical conductivity, and are of novel cross section, whereby the bond terminals are made more readily adapted for use in applying the rail bonds to the track rails by the well known and increasingly used autogeneous welding process.

Another object of the invention is to provide a rail bond having terminals of novel construction wherein a cupped face is provided thereon which is adapted to co-operate with an adjacent face of the track rail in forming a pocket having a relatively wide bottom, which facilitates the introduction of the welding electrode therein, and lessens the difficulties met with in supplying the molten metal used in securing the bond terminals to the track rails.

Another object of the invention is to provide a rail bond having terminals constructed in such manner that in welding the terminals to the track rails, an edge contact is made with the track rails, and a maximum area of rail surface for a terminal of given size is exposed for engagement with the welding metal used in attaching the terminals to the rails, and the conductivity of the rail bond thereby increased.

A further object of our invention is to provide a rail bond of improved construction which permits the composite terminals to be forged to the peculiar shape forming part of this invention and to be made more dense and homogeneous, in completing the terminals to the desired size and contour.

Further objects of our invention will be made apparent in the detailed description in the following specification, and in the accompanying drawings forming part of this specification, in which:

Figure 1 is an end elevation showing a rail bond embodying our invention as welded to track rail by means of an electric arc.

Figure 2 is a side elevation of the rail bond of Figure 1, the track rail being omitted for the sake of clearness.

Figure 3 is a perspective view showing details in the construction of one form of hollow, trough-like, metal shell used in fabricating the bond terminals, and in applying the terminals to the ends of the conductors in making rail bonds embodying our invention.

Figure 4 is a similar perspective view, showing a modified form of terminal shell adapted for use in making rail bonds embodying our invention.

Figure 5 is a perspective view, similar to that of Figure 3 and Figure 4, showing a further modified form of terminal shell, usable in making rail bonds embodying our invention.

Referring now to the drawings, the numeral 2 designates the conductor, and 3, in a general way, the terminals of a rail bond made in accordance with our invention, the rail bond being shown in Figure 1 as secured to a track rail 4 by means of arc welding, the attachment of the bond terminal to the rail being secured by the welding metal 5.

By reference to the drawings, it will be seen that one face 6 of 'he rail bond terminals 3 is made concave so as to coact with the face of the rail 4 and form a pocket 7 having a relatively wide bottom, the lower portion 8 of the side of the bond terminal below the concave face 6 having what is practically a line contact with the track rails, when the terminal is clamped in place, in readiness for the welding operation by which the terminal is fastened to the track rail 4.

As experience shows, it is extremely difficult, particularly in the field, to weld two metals which differ in composition or in electrical conductivity, the terminals 3 of our improved rail bonds are provided with a ferrous metal shell or crust which is formed of a metal of substantially the same composition or electrical conductivity as the metal of the track rails to which the rail bonds are to be applied.

In building up or fabricating the bond terminals, the end of a bar of steel or other metal of suitable composition is heated and drop forged, so as to form a hollow, thin walled metal shell 9 of the approximate outline of the finished bond terminals. This metal shell will be of the cross section shown in Figure 3 or, when desired, will be made as shown in Figure 4 or Figure 5. In all cases, the rail engaging side or face 6 of the ferrous metal shell will be curved so as to form a depression or recess 7 therein, having a wide bottom. One side of the terminal shells 9 will be open to facilitate the introduction of the metal forming the filling or body portion 10 of the terminals, and another side thereof will be provided with a boss 11, through which the end of the conductor 2 extends into the cavity or interior 12 of the hollow metal shell 9, when the molten metal forming the filling or body portion 10 of the terminal is put into the hollow, trough-like metal shell, as is done in making rail bonds in accordance with our invention.

The molten metal forming the filling or body portion of the terminals may be supplied in any desired manner, a convenient way of providing this molten metal is by melting a rod or pencil of suitable composition (generally copper or a copper alloy) by means of an electric arc, and allowing the molten metal, as melted off the end of the rod or pencil, to drop into the recess or cavity 12 of the hollow terminal shell. Before commencing to fill the shell with molten metal, its inner surfaces will be cleaned, in order to remove all oxide therefrom. In melting the pencil one pole of an electric circuit will be connected to the shell, or preferably to the bond conductor 2, and the other terminal may be a non-metallic electrode, or in some cases will be the welding pencil itself.

At the commencement of the shell filling operation, an electric arc will be formed so as to heat and fuse the inner surfaces of the terminal shell and the end of the conductor which extends into the shell. In this way, the molten metal is supplied and is welded and firmly united to the terminal shell and conductor end, so as to form a substantially integral mass.

After the shell of the terminal has been filled with molten metal from the rod or pencil, the terminal will have a more or less rough appearance, although usable in bonding rails. But in order to give the rail bond a neat, finished appearance, and at the same time to compact and make the metal filling within the terminal shell more dense, and shape the bond terminal to exact size and contour, the so-formed terminals are subject to a rough forging operation. Forging dies having cavities of the necessary shape and size will be employed. The bond terminals, after being heated to a forging temperature, are placed between the dies and are drop forged therebetween, as has been described. The flash or fin which forms on the terminals in this drop forging operation is then removed, by shearing or in any other approved manner, and after the terminal 3 on each end of the bond conductor 2 has been forged and finished, a complete rail bond having a neat, finished appearance is produced.

The advantages of my invention will be apparent to those skilled in the art. By making rail bonds of the herein described shape and composition, a superior product is obtained which, on account of the composition and shape of its bonding face, enables the rail bonds to be easily and quickly fastened to the track rails, by means of the electric arc, in a more secure and effective manner than is ordinarily possible with rail bonds as made heretofore.

Various modifications which will suggest themselves, may be made in the construction of the rail bond terminals without departing from our invention as defined in the appended claims.

We claim:—

1. A rail bond comprising a flexible conductor having T-head terminals welded to the ends thereof, said terminals having a central core or body formed of cuprous metal and welded to an outer shell of ferrous metal, said shell extending over all but one side face of said cuprous core or body, and said composite terminals having a concave face on one of the shell covered sides thereof, with the portion of said side below said concave face adapted to engage the rail when the bond is put into use.

2. A rail bond comprising a flexible conductor having T-head terminals welded to the ends thereof, said terminals having a central core or body formed of cuprous metal and welded to an outer shell of ferrous metal, said shell extending over all but one side face of said cuprous core or body, and said composite terminals being forged to size and shape and having a concave face on one of the shell covered sides thereof, with the portion of said side below said concave face adapted to engage the rail when the bond is put into use.

In testimony whereof, we have hereunto signed our names.

FRANK P. DAHLSTROM.
CHARLES L. LARSON.